United States Patent [19]

Hehl

[11] Patent Number: 4,753,589
[45] Date of Patent: Jun. 28, 1988

[54] TRANSPOSING APPARATUS FOR A PLASTICIZING UNIT OF AN INJECTION MOLDING MACHINE

[76] Inventor: Karl Hehl, Arthur-Hehl-Strasse 32, D-7298 Lossburg 1, Fed. Rep. of Germany

[21] Appl. No.: 78,674

[22] Filed: Jul. 28, 1987

[30] Foreign Application Priority Data

Aug. 6, 1986 [DE] Fed. Rep. of Germany ....... 3626647

[51] Int. Cl.$^4$ ............................................. B29C 45/07
[52] U.S. Cl. .................................... 425/186; 425/190; 425/542
[58] Field of Search ................. 425/183, 186, 190, 542

[56] References Cited

U.S. PATENT DOCUMENTS 4,421,469 12/1983 Egger et al. ......................... 425/186
4,615,670 10/1986 Brandt et al. ........................ 425/186
4,648,825 3/1987 Heil et al. ............................. 425/190

FOREIGN PATENT DOCUMENTS 69221 9/1984 European Pat. Off. .

Primary Examiner—Willard Hoag
Attorney, Agent, or Firm—Spencer & Frank

[57] ABSTRACT

A transposing apparatus for moving a replaceable plasticizing unit of an injection molding machine from a position in which it is disengaged from an injection mold assembly of the machine, but is still in an axial alignment with the injection axis thereof, onto an emplacement spaced from the injection axis. The apparatus includes a stationarily supported transport rail oriented generally horizontally and transversely to the injection axis; a sled mounted for travel on the transport rail; and a hoisting device mounted on the sled for lifting the plasticizing unit into and holding it at a transporting height while the sled moves with the hoisting device from the disengaged position to the emplacement. The transposing apparatus has a pivotal lever forming part of the hoisting device and is mounted on the sled for up and down swinging motions about a generally horizontal axis; and first and second cooperating coupling devices mounted on the plasticizing unit and the pivotal lever, respectively. The first and second coupling devices have a connected state in which the plasticizing unit is rigidly coupled to the pivotal lever for movement from a generally horizontal orientation from the disengaged position or the emplacement through an approximately 90° turn into an upended orientation into the transporting level.

14 Claims, 8 Drawing Sheets

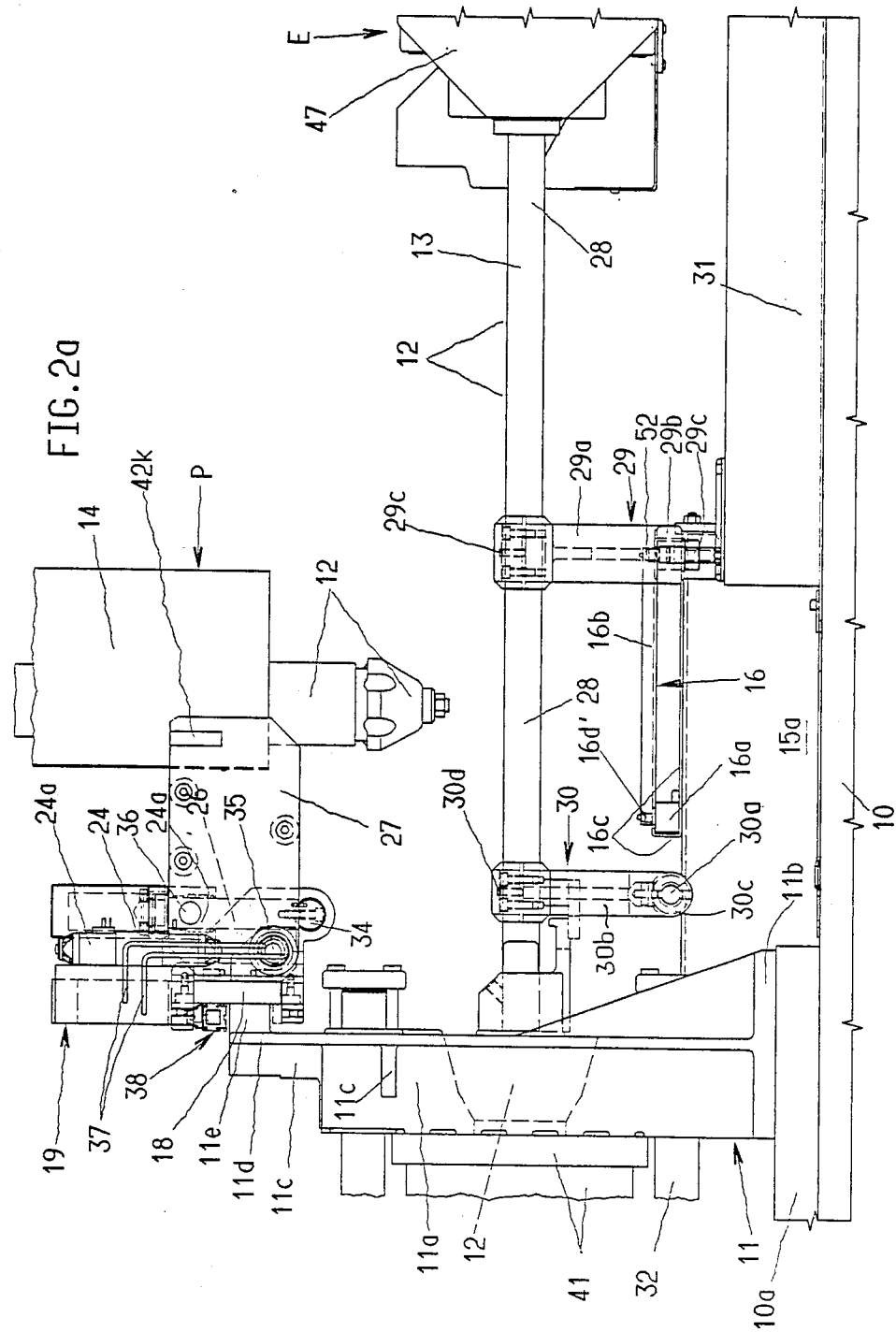

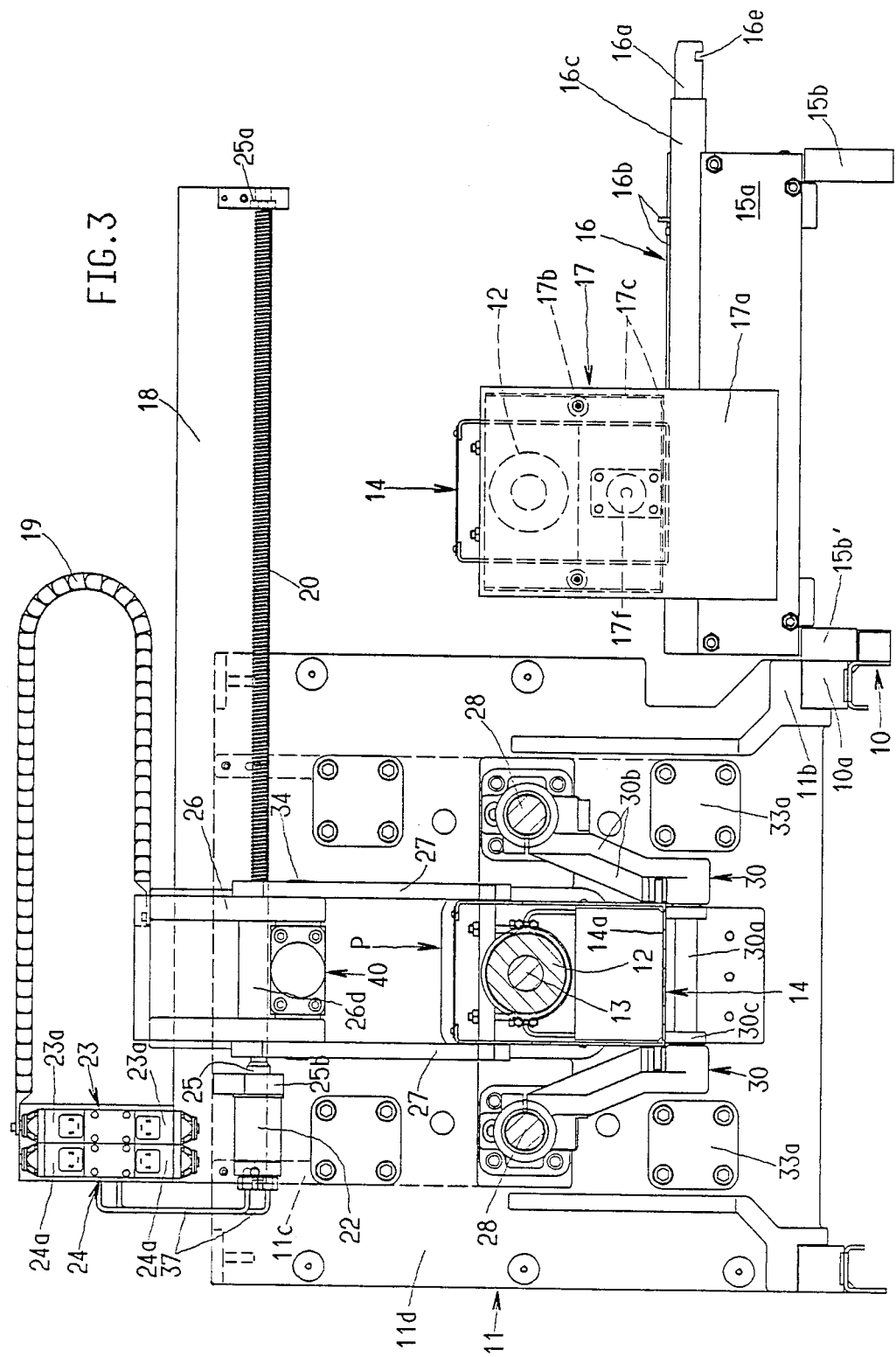

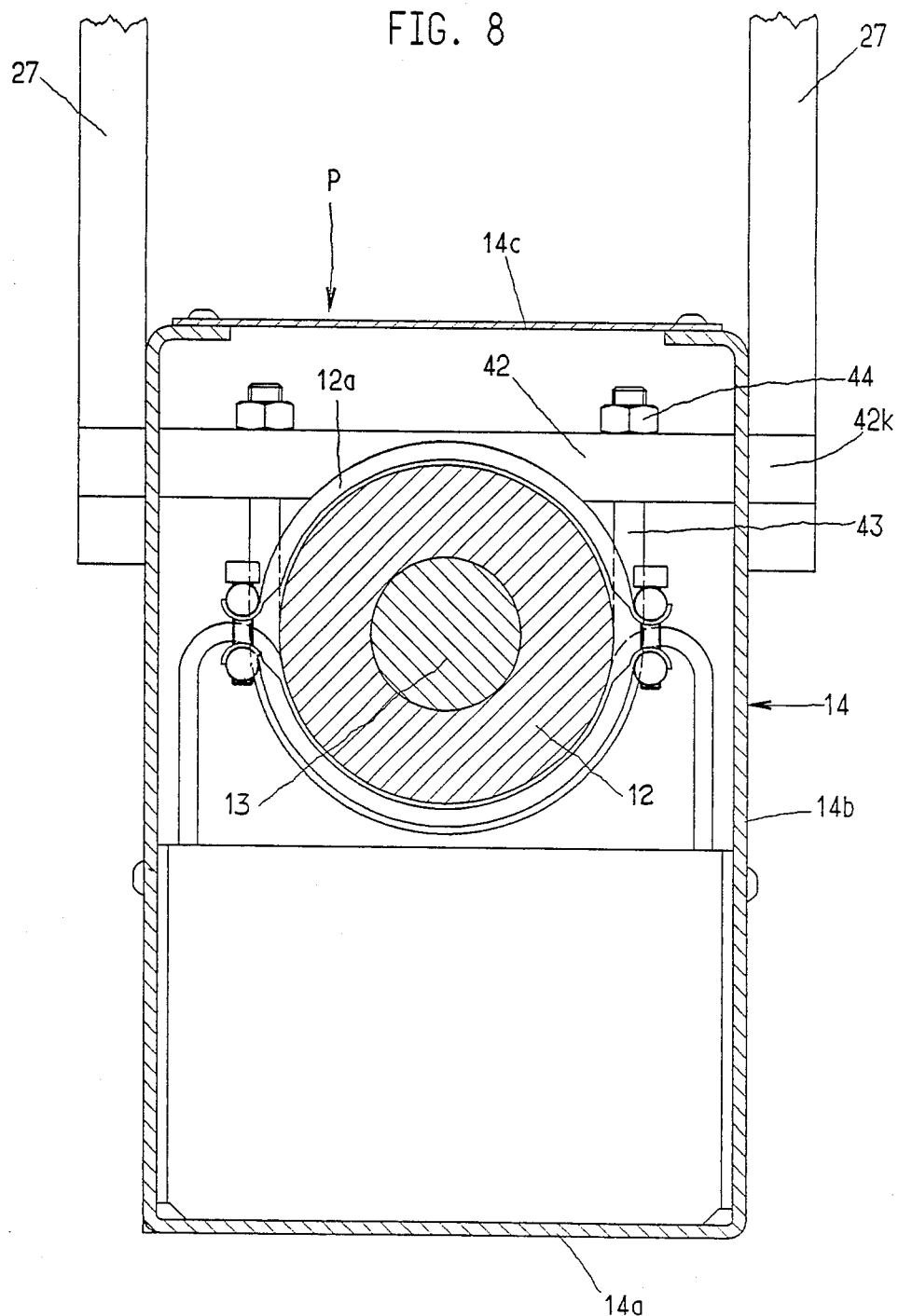

4,753,589

TRANSPOSING APPARATUS FOR A PLASTICIZING UNIT OF AN INJECTION MOLDING MACHINE

BACKGROUND OF THE INVENTION

This invention is in the field of plastic injection molding machines and more particularly relates to an apparatus for transposing the plasticizing unit from or to a position in which, withdrawn from the injection molding unit, it rests on a support in an orientation approximately coaxially with the injection axis, to or from an emplacement situated at the rear side of the injection molding machine. The injection molding machine has at least one hydraulic power cylinder assembly for axially displacing the injection molding unit—including the plasticizing unit—from an injection position in which it injects synthetic material into the injection mold assembly, into a disengaged position in which the plasticizing unit is withdrawn and thermally separated from the injection mold assembly and in which the longitudinal axis of the plasticizing unit is still substantially coaxial with the injection axis.

The transposing apparatus has at least one stationary transport rail oriented transversely to the injection axis, a sled mounted for travel on the transport rail and a hoisting device mounted on the sled and arranged for lifting the plasticizing unit to a transporting height. The hoisting device has a sled-side coupling arrangement which is complemental and cooperates with a cylinder-side coupling arrangement of the plasticizing unit.

In a transposing apparatus of the above-outlined type, as disclosed, for example, in European Pat. No. 69,221, a frame construction mounted on the ceiling of the plant room extends over the injection molding machines as well as a storage magazine for the plasticizing units. The frame construction supports a gantry which is movable transversely to the injection axis of the injection molding machines and which has a trolley movable relative to the gantry parallel to the injection axis. The trolley has a vertically movable carrier arm with coupling organs. When a plasticizing unit is to be replaced, first its connections with the injection molding unit are uncoupled. Thereafter the plasticizing unit is grasped with the coupling organs of the trolley, conveyed to the storage magazine and deposited therein. Subsequently, the carrier arm grasps the new plasticizing unit and, after conveyance in the opposite direction, deposits the plasticizing unit into the respective injection molding machine. During the transport from the injection molding machines to the storage magazine, the plasticizing units are suspended from the carrier arm of the trolley and necessarily travel in an elevated transporting position above the areas occupied by operating personnel at the service side of the injection molding machines.

SUMMARY OF THE INVENTION

It is an object of the invention to provide an improved transposing apparatus of the above-outlined type which may be integrated in the injection molding machine either during mass manufacture thereof or in retrofitting and which, for the purpose of facilitating a computer-controlled replacement of the plasticizing unit, is designed exclusively to execute transposing motions imposed thereon.

These objects and others to become apparent as the specification progresses, are accomplished by the invention, according to which, briefly stated, the transposing apparatus comprises a pivotal lever forming part of the hoisting device and is mounted on the sled for up and down swinging motions about a generally horizontal axis; and first and second cooperating coupling devices mounted on the plasticizing unit and the pivotal lever, respectively. The first and second coupling devices have a connected state in which the plasticizing unit is rigidly coupled to the pivotal lever for movement from a generally horizontal orientation from the disengaged position or the emplacement through an approximately 90° turn into an upended orientation into the transporting level. There is further provided a power drive for swinging the pivotal lever, with the plasticizing unit rigidly attached theret by the first and second coupling devices, into and out of the transporting level.

It is an advantage of the invention that the plasticizing unit may be hoisted to or deposited from a lower transport level which may be, for example, at breast height. Thus, by virtue of the invention an overhead travel of the components above the service side of the injection molding machines and above the operating personnel is avoided. It is a further advantage of the invention that the conditions for a space-saving grouping of injection molding machines may be realized for effecting a linear transport to and from the storage magazine and wherein the path of conveyance is situated at the rear sides of the injection molding machines where no operating personnel need be present.

BRIEF DESCRIPTION OF THE DRAWING

FIG. 2a is a side elevational view similar to FIG. 2, depicted during a transverse conveyance of a plasticizing unit.

FIG. 3 is a sectional view taken along line III—III of FIG. 1.

FIG. 8 is a sectional front elevational view of a plasticizing unit coupled to pivotal levers of the preferred embodiment.

DESCRIPTION OF THE PREFERRE EMBODIMENT

Figure 1:
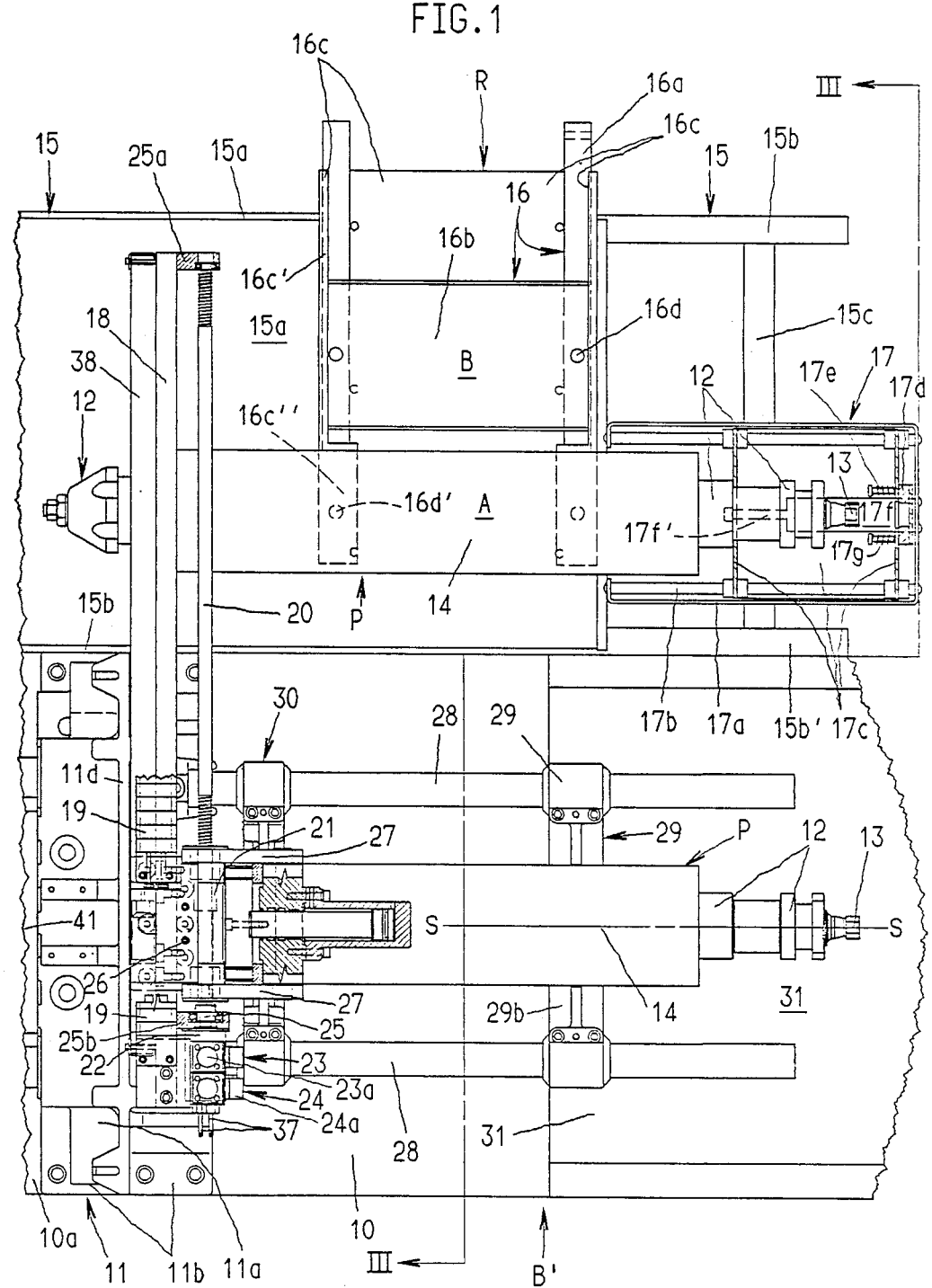
FIG. 1 is a fragmentary top plan view of an injection molding machine incorporating a preferred embodiment of the invention and illustrated in the zone of the transposing device showing one plasticizing unit in the disengaged position and showing a further plasticizing unit on an emplacement of a changing table.
Figure 2:
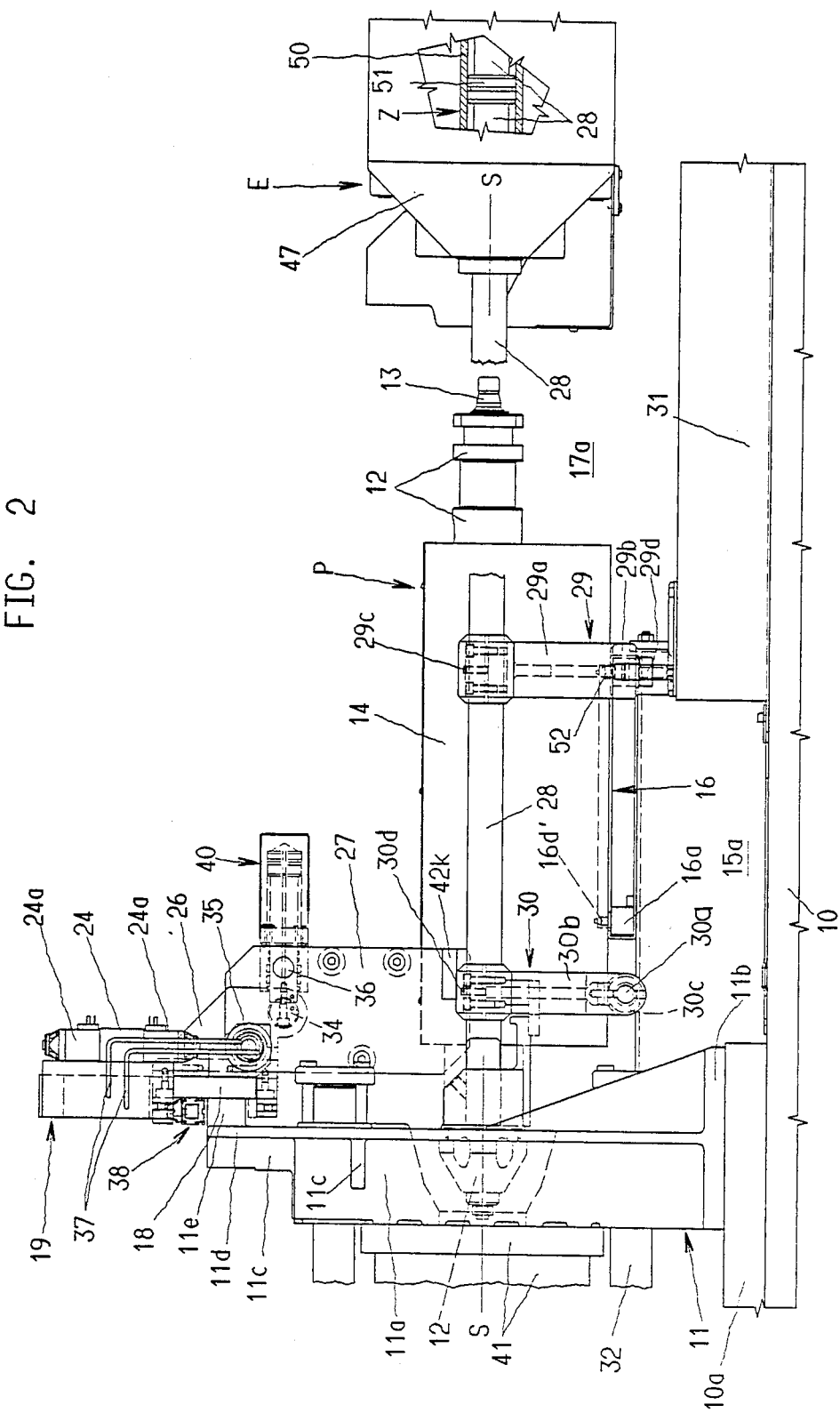
FIG. 2 is a side elevational view of the construction illustrated in FIG. 1, seen from the service side B′.

Turning to FIGS. 1 and 2, there is shown therein an injection molding machine which, according to the invention, incorporates a novel apparatus for transposing a plasticizing unit P after it is uncoupled from an injection molding unit E. The transposition is an operation which is part of a replacement process for exchanging the plasticizing unit P of a selected injection molding machine.

Within the framework of a computer-controlled replacement the plasticizing unit P is, from a normal working (injecting) position in which it is in coupling engagement with the injection mold assembly 41, displaced axially into a disengaged position in which the plasticizing unit P that comprises a plasticizing cylinder 12 and a feed screw 13 is thermally separated from the injection mold assembly 41 but remains oriented at least approximately coaxially with the injection axis s—s. Thereafter, the plasticizing unit P is disconnected from the other components of the injection molding unit and, with the aid of the transposing apparatus, placed from its disengaged position onto an emplacement A or B which is situated externally of the injection molding machine and which is formed on a changing table 15 or a transport carriage. Thereafter, the plasticizing unit P is conveyed from the emplacement, for example, to a storage magazine. The new plasticizing unit to be inserted into the injection molding machine is conveyed thereto in a reverse direction and in a reverse order of the described operational steps.

The transposing apparatus is fully integrated into the injection molding machine. In the description which follows, first the construction of the injection molding machine and the associated changing table will be described.

The injection molding machine includes a mold closing unit for firmly clamping the injection mold assembly 41 by means of a non-illustrated movable mold carrier guided on horizontal columns 32 and rolling on guide rails 10a of the machine bed 10 as well as a stationary mold carrier 11 which is supported by centering legs 11b on guide rails 10a mounted on the machine bed 10. The stationary mold carrier 11 is, for the purpose of reinforcement, provided with a stiffening member 11d extending over three sides of the mold carrier body 11a proper and a further stiffening rib 11c.

The horizontal injection molding unit E is supported on a pedestal 31 of the machine bed 10 and is displaceably guided on horizontal guide columns 28 which are arranged at the height of the injection axis s—s and which are anchored at their frontal end in the stationary mold carrier 11. Also referring to FIG. 2a, the columns 28 are further supported on the pedestal 31 by means of a supporting device 29. Further supports (not illustrated) are mounted on the rear end of the guide columns 28. The supporting device 29 includes a U-shaped support yoke having vertical legs 29a whose free upper ends surround, by means of respective sleeves 29c, the adjacent guide column 28 and whose bottom web portion 29b is supported on the pedestal 31 by a height-adjustable supporting member 29d.

As may be particularly well seen in FIG. 2, the injection molding unit E is, together with the plasticizing unit P (which in FIG. 2 is shown in an already uncoupled state) axially displaceable on the columns 28 with the aid of a power cylinder arrangement Z which includes pistons 51 fixedly mounted on the columns 28 and the cylinders 50 proper which are connected with drive aggregates 47 of the injection molding unit E. By hydraulically charging the one or the other side of the pistons 51, there occurs a displacement of the injection molding unit E or the carrier block 47 with the associated drive aggregates in the one or the other direction on the columns 28.

Reverting to FIG. 1, the service side of the injection molding machine is designated at B' whereas the reverse (rear) side is designated at R. At the reverse side R the injection molding machine is provided with a mold changing table 15 of the type described in copending U.S. application Ser. No. 07/051,387, filed May 19, 1987. The mold changing table 15 has two emplacements (support locations for the mold assembly) A, B which have different distances from the injection axis s—s. The emplacements A, B which are adapted to receive from above the plasticizing unit P to be replaced, are formed on a quadratic sheet metal carrier body 15a as seen in FIGS. 1, 2, 2a and 3. The carrier body 15a is supported on rails 15b', 15b. The rail 15b' is secured to the runner rail 10a secured to the machine bed 10, while the other rail 15b is supported on the ground and is connected by transverse members 15c with the rail 15b' for stabilizing purposes. The carrier body 15a of the changing table 15 is propelled on the rails 15b, 15b' parallel to the injection axis s—s by means of a power drive such as a hydraulic cylinder or a circulating ball-type drive and may be arrested in a position as shown in FIG. 1.

On the emplacement B there is situated a pallet 16. During the replacement operation, the plasticizing unit P may be deposited on or lifted from the pallet 16. The latter is formed by two parallel slide bars 16a which are connected to one another by means of a profiled sheet metal connecting plate 16b and on which there are arranged centering pins 16d for centering the plasticizing unit P on the pallet 16. The pallet 16 may be displaced in a pallet guide 16c transversely to the injection axis s—s. The pallet guide 16c is formed by a profiled sheet metal having a bent edge 16c' which extends over the respective adjacent slide bar 16a. The slide bars 16a extend into the emplacement A as seen in FIG. 1, and are at their ends surrounded by the enlarged, bent-around edges 16c" which are provided with centering pins 16d'. The plasticizing unit P rests on the enlarged edges 16c" and is centered by means of the centering pins 16d' on the emplacement A.

The plasticizing unit P to be replaced is set on the emplacements A, B or is withdrawn therefrom selectively by means of a reversing device to be described in greater detail later. The emplacement A is designed as a conditioning station where the plasticizing unit P is prepared and, in particular, brought to operational temperatures prior to its insertion into the injection molding machine. The plasticizing unit P positioned on the emplacement B forms with the pallet 16 a transport unit for removal. The transport unit is moved onto a transport carriage from the emplacement B constituting a transfer station. For this operation a transverse groove 16e (FIG. 3), functioning as a coupling organ is provided in the slide rod 16a.

In the description which follows the structure of the plasticizing unit P will be set forth, particularly with reference to FIG. 8.

The plasticizing unit P includes the plasticizing cylinder 12 which is provided with a heater assembly 12a and which is, by means of horizontal transverse carrier member 42 and clamping yokes 43 (only one of each is shown in FIG. 8) rigidly connected with the vertical side walls 14b of a rectangular, generally U-shaped, one-piece, upwardly open casing 14. At the top the vertical side walls 14b are connected by an upper horizontal closure 14c which complements the rectangular, cross-sectionally U-shaped casing 14 into a closed, rectangular tubular component which spacedly surrounds the plasticizing cylinder 12. The clamping yoke 43 surrounding the plasticizing cylinder 12 in a cradle-like manner passes through openings of the respective transverse carrier members 42. Tensioning nuts 44 threadedly engage the end portions of the clamping yokes 43 and provide for a secure tightening of the plasticizing cylinder 12 with the transverse members 42. The bottom wall 14a of the casing 14 serves as a support face when the plasticizing unit P is positioned on the emplacements A, B at which time—as shown in FIG. 1—centering pins 16d and 16d' penetrate into arresting holes provided in the bottom wall 14a.

The plasticizing unit P situated in the disengaged position is, subsequent to its uncoupling from the drive aggregate 47 supported by the horizontal bottom wall 14a of the casing 14 as seen in particular in FIGS. 1-4. For supporting the plasticizing unit P there is provided a first supporting device 30 which is ahead of the center of gravity of the plasticizing unit P as well as a second supporting device 29 which, in turn, is arranged rearwardly of the center of gravity of the plasticizing unit P.

The first supporting unit 30 includes a horizontal support shaft 30a which is provided with runner wheels 30c which support the plasticizing unit P by rollingly engaging the bottom wall 14a for an axial displaceability of the plasticizing unit P. The support shaft 30a is held in guide columns 28 by means of carrier arms 30b. The carrier arms 30b are tightened to the columns 28 by clamping sleeves 30d. In the second supporting device 29 the plasticizing unit P is, by means of its bottom wall 14a axially immovably supported on the horizontal web 29b. The supporting device 29 also serves for holding the guide columns 28. For an axial immobilization of the plasticizing unit P on the supporting device 29 there is provided an arresting pin 52 which is supported in the web 29b and which may be hydraulically moved into an arresting hole provided in the bottom wall 14a of the casing 14.

Turning now to the transposing apparatus according to the invention, by means of which the plasticizing unit P, stably supported in its disengaged state in a horizontal orientation on the supporting devices 29 and 30, may be lifted and rotated 90° about a horizontal axis to assume a vertical orientation as shown in FIG. 2a and subsequently transported on a horizontal transport rail 18 transversely to the injection axis s—s and thereafter deposited selectively onto an emplacement A or B while it is swung back into its horizontal orientation, as shown in FIG. 1. The upstanding, cross-sectionally rectangular transport rail 18 is fixedly secured to support extensions 11e of the stationary mold carrier 11 and is at a distance from the rearward vertical surface of the mold carrier 11. The distance corresponds to the height of the support extensions 11e which are formed on the upper edge of a stiffening shield 11d reinforced by ribs 11c of the stationary mold carrier 11.

With particular reference to FIGS. 3-6, on the transport rail 18 there is mounted for travel a motor-driven, cross-sectionally generally U-shaped sled 26 which surrounds the transport rail 18 with a slight play on three sides and which is in engagement with the transport rail 18 on its opposite vertical wide sides as well as on its opposite horizontal narrow sides by means of runner wheels 39a, 39b and 39c. The generally upright, U-shaped base body of the sled 26 has a vertical web 26c which cooperates with the adjacent vertical wide side of the transport rail 18. Further, the two legs 26b of the "U" which extend from the web 26c horizontally in the direction of the mold closing unit, cover from the top and the bottom the narrow sides of the transport rail 18. Both U-legs 26b are provided with prolongations 26a, 26a' which project beyond the narrow sides of the transport rail 18 in the direction of the mold closing unit. On the web 26c there is formed a rearward support part 26d for constituting the bearing for the pivotal shafts of the transposing device. In the prolongations 26a, 26a' there are journaling those runner wheels 39a which engage the transport rail 18 on the side which is oriented towards the mold closing unit. The runner wheels 39c which engage the opposite wide side of the transport rail 18 are positioned in vertical bores of the web 26c. The runner wheels 39b, 39b' which engage the narrow sides of the transport rail 18 are situated in horizontal bores of the U-legs 26b. The upper runner wheels 39b' are offset with respect to the lower runner wheels 39b towards the vertical symmetry plane of the sled 26.

A pivotal lever 27 swingable about 90° about a horizontal axis by means of a hydraulic piston-and-cylinder unit 40 may be coupled to a horizontally oriented plasticizing unit P situated either in its disengaged position (resting on supports 29 and 30) or on one of the emplacements A or B. In such coupled position the plasticizing unit P and the lever 27 form a rigid assembly which may thus be swung by the piston-and-cylinder unit 40 about 90° into the conveying height.

Figure 5:
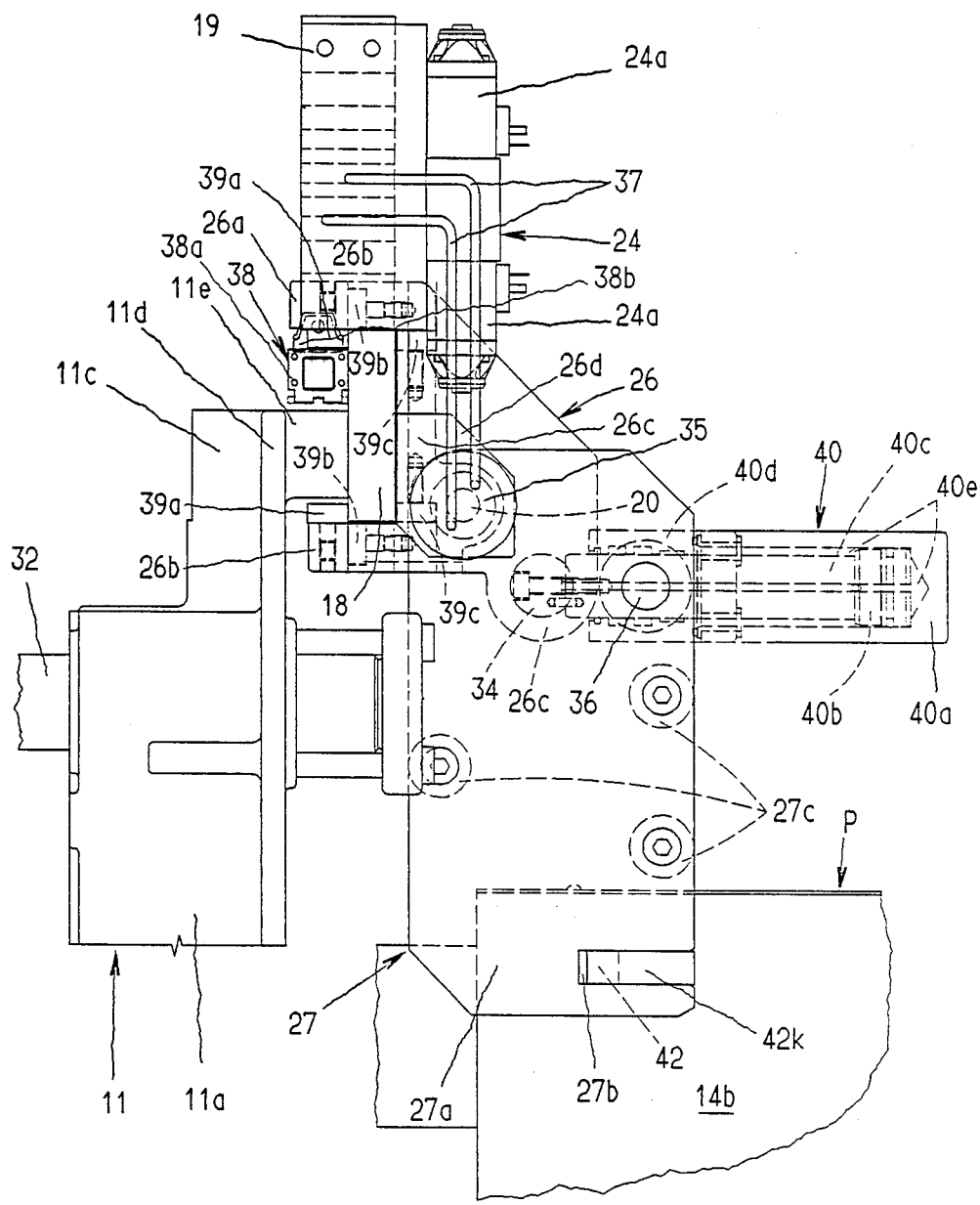
FIG. 5 is a side elevational view of the construction shown in FIG. 4 (several components are omitted for the sake of clarity).

The coupling between the plasticizing unit P and the pivotal arm 27 is effected by a pin-and-socket coupling formed of pins 42k provided at opposite ends of the transverse members 42 and complemental sockets 27b provided in the pivotal arm 27 as best seen in FIG. 5. A rigid coupling between the plasticizing unit P and the pivotal lever 27 with the aid of components 42k and 27b may be achieved by virtue of a motion of the plasticizing unit P parallel to the injection axis s—s or a similar motion of the changing table 15.

Figure 6:
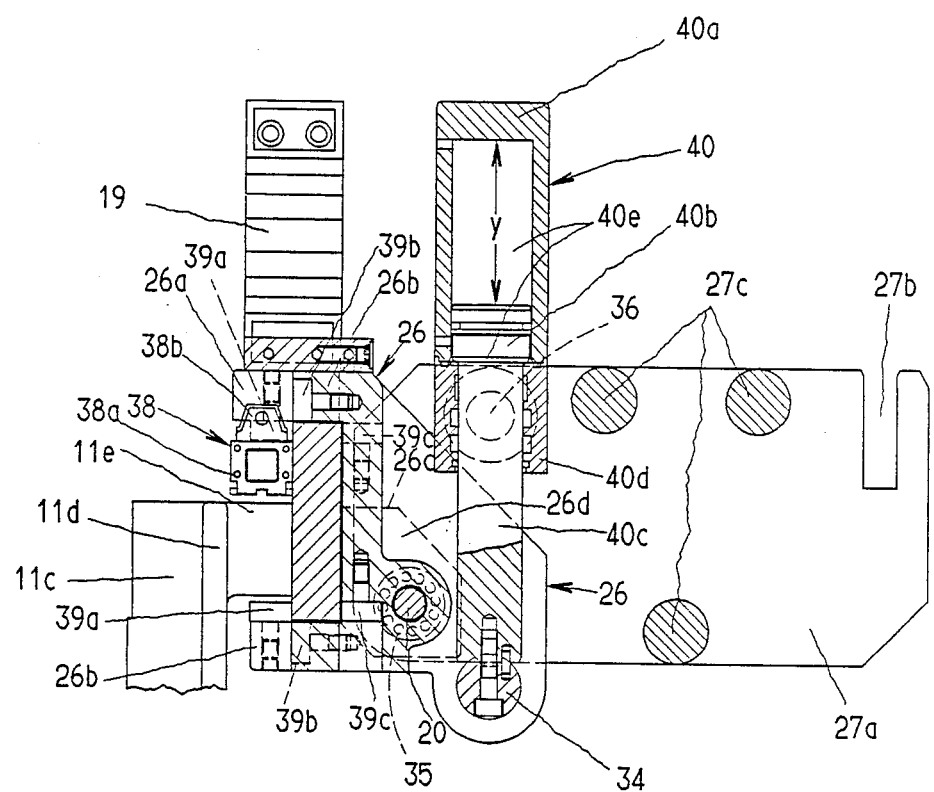
FIG. 6 is a sectional side elevational view of one part of the structure shown in FIG. 5.

The pivotal lever 27 comprises parallel plates 27a provided with the sockets 27b which are constituted by open slots. In a lower terminal position of the pivotal lever 27, as shown in FIG. 5, the slots 27b are horizontal whereas in an upper end position, as shown in FIG. 6, they are vertically oriented. The coupling organs on the cylinder side, formed by the pins 42k, are at an axial distance from the nozzle of the plasticizing cylinder 12. The axial distance is approximately ⅓ of the length of the plasticizing unit P. The free ends of the transverse member 42 passing through the vertical side walls 14b of the casing 14 form the coupling pins 42k which are of rectangular cross-sectional shape and which are welded to the outer faces of the respective vertical side walls 14b of the casing 14.

Figure 4:
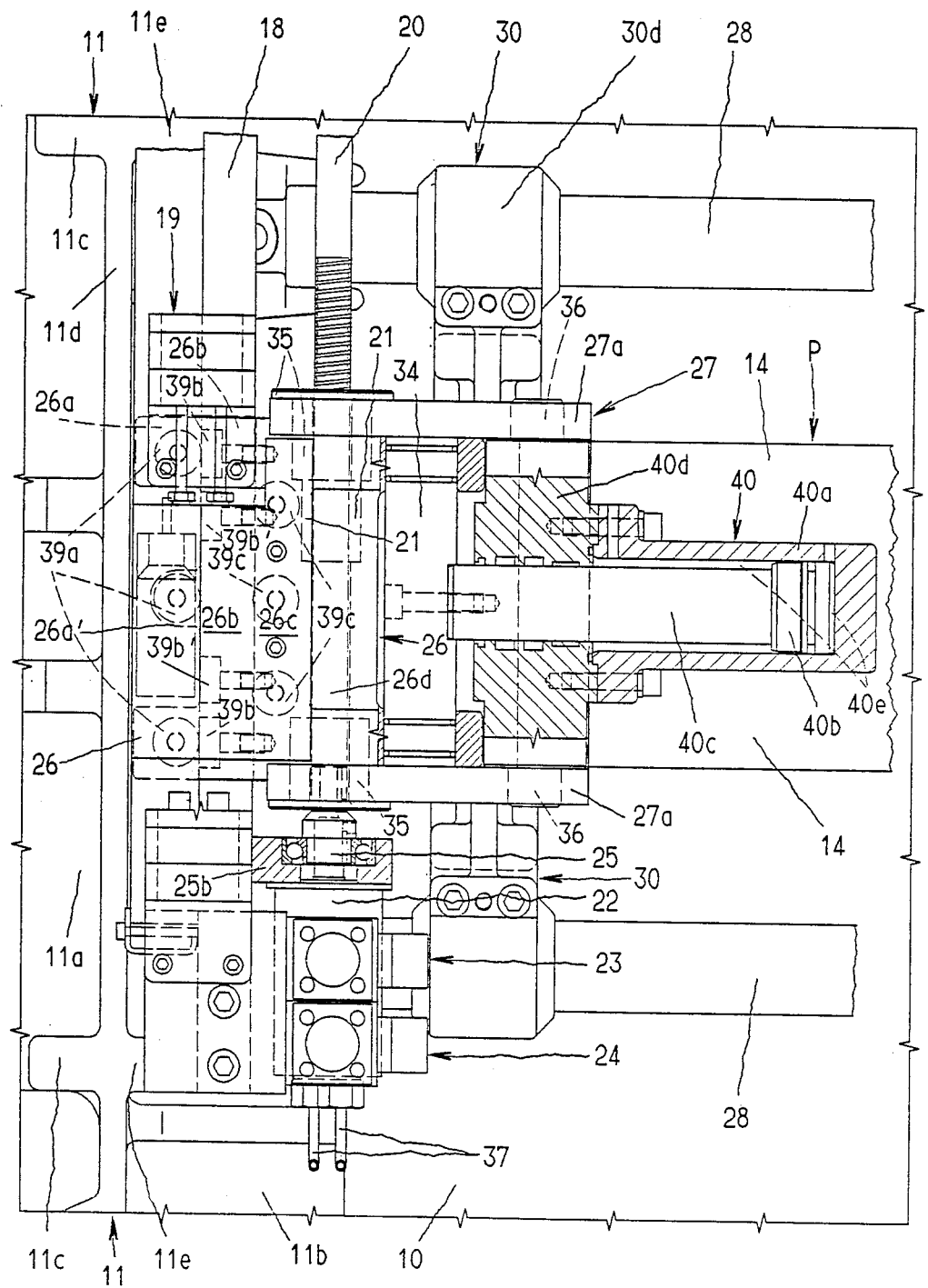
FIG. 4 is a partially sectional top plan view of an enlarged detail of FIG. 1.
Figure 7:
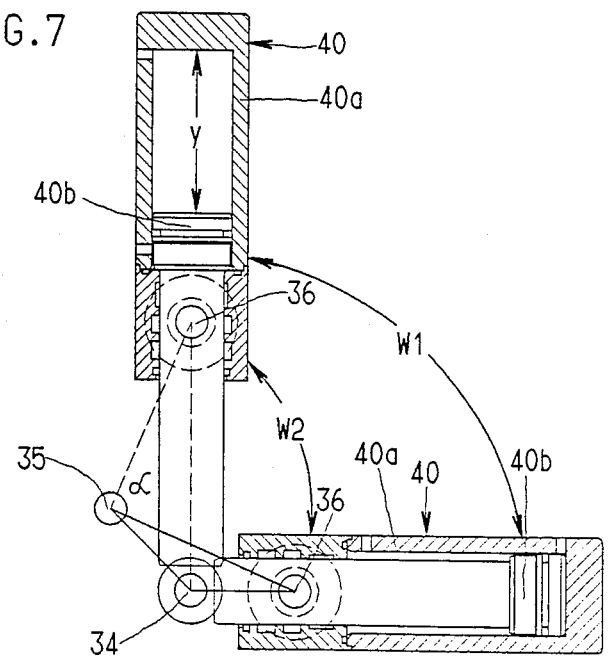
FIG. 7 is a sectional elevational detail view to illustrate forces effective during pivoting of the plasticizing unit and the pivotal paths of the pivotal lever and a piston-and-cylinder drive unit.

The pivotal axis of the pivotal lever 27 is formed by rotary sleeves 35 which are fitted into horizontal bores of the bearing portion 26d of the sled 26 on either side and on which the plates 27a of the pivotal lever 27 are pivotally supported as shown in FIGS. 4, 5 and 6. The hydraulic piston-and-cylinder unit 40 is arranged between the plates 27a. The cylinder 40a of the unit 40 is secured to the pivotal lever 27 by means of the cylinder closure 40d which, in turn, is supported in the plates 27a by means of cylindrical pins 36. The direction of stroke of the piston-and-cylinder unit 40 is oriented parallel to the slots 27b. The piston rod 40c of the power cylinder unit 40 is countersupported on a shaft pin 34 pivotal in a bearing portion 26d about a horizontal axis. As particularly well seen in FIG. 7, taken in conjunction with FIGS. 5 and 6, it will be apparent that the rigid unit formed of the cylinder 40a and the pivotal lever 27 is swingable about the rotary sleeves 35 so that this unit describes a pivotal path w2 in the zone of the pivot pins 36. The piston 40b, on the other hand, describes about the shaft pin 34 a pivotal path w1 which has a radius other than that of the pivotal path w2. By virtue of this arrangement, upon a pivotal motion of the pivotal lever 27 about 90° there is obtained a relative linear displacement y between the piston 40b and the cylinder 40a. Upon energization of the piston 40b there is additionally obtained a pivoting tendency because the cylinder 40a with the pivotal lever 27 and the piston 40b are supported on shafts which are spaced from one another so that there is obtained a corresponding force triangle 35, 34, 36, resulting in a torque. The two parallel plates 27a are connected with one another by transverse members 27c for stabilizing purposes.

The coupling motion of the plasticizing unit P or, as the case may be, the changing table 15 and thus the emplacement A and B for establishing the rigid connection between the plasticizing unit P and the lever 27 is effected—in case the plasticizing unit P is the movable component—by a stroke of the power cylinder Z also utilized for bringing and maintaining the injection molding unit E in engagement with the injection mold assembly (FIG. 2). In case the changing table 15 is the movable component, the coupling motion is effected by a hydraulic drive which is associated with the changing table 15 and which is in any event required in connection with the utilization of the changing table for the replacement of the injection mold assembly of the associated injection molding machine. During the coupling motion, the rectangular connecting pins 42k of the plasticizing unit P are introduced into the horizontal slots 27b of the pivotal lever 27, whereby a form-locking connection is established. Upon a relative motion in the opposite direction, the pins 42k are pulled out of the open slots 27b, whereby uncoupling is effected.

With particular reference to FIGS. 3–6, the sled 26 is displaceable on the transport rail 18 by means of an axially supported and motor-driven, rotatable, circulating ball-type drive spindle 20 and a circulating ball-type nut 21 cooperating with the spindle 20 and mounted on the sled 26. The spindle 20 coaxially traverses the sleeves 35 which form the pivotal shaft for the pivotal lever 27. As seen in FIG. 3, the spindle 20 is rotatably and axially immovably supported in a bearing 25a which is affixed to the transport rail 18 and which holds that end of the spindle 20 which is oriented towards the changing table 15. At the other end the spindle 20 is supported by a bearing member 25b which is affixed to the transport rail 18 and in which the coupling mechanism between the spindle 20 and a hydraulic motor 22 is accommodated. The hydraulic motor 22 is supplied by conduits 37 with hydraulic fluid via a distributor block 24 having associated switching valves 24a.

The piston-and-cylinder unit 40 is, with the aid of a distributor block 23 and the associated switching valves 23a supplied with energy by a flexible service cable 19 whose one end is secured to the sled 26 as shown in FIG. 3. Bores lead from the coupling location of the service cable 19 to the cylinder chambers 40e of the cylinder 40a. Upon rotation of the spindle 20 in the one or the other direction, the nut 21 which is non-rotatably affixed to the sled 26 and which is coupled to the spindle by bearing balls, executes an axial motion, whereby the sled 26 is displaced. The motion characteristics depend on the pitch of the ball-receiving grooves in the nut 21 and the spindle 20.

There is further provided a linear potentiometer 38 which serves as a path sensing device and which makes possible a selective programming of transverse transports of different lengths. By virtue of this arrangement, the plasticizing unit P is, according to the program, displaced on the transport rail 18 and deposited on the emplacement A or B of the changing table 15 or—in case no changing table 15 is present—is deposited directly on an emplacement provided on a transport carriage. An elongated housing 38a which accommodates the potentiometer 38 and which has a tubular rectangular cross section is secured to the transport rail 18 as illustrated in FIG. 6. A slider 38b in which the voltage sensing brushes are arranged is connected by an articulation with the sled 26. The surface (resistance track and collector track) scanned by the brushes is arranged in a ribbon-shaped carrier in the housing 38a.

Reverting in particular to FIG. 1, the emplacement A which serves as a conditioning station is, on the side oriented away from the nozzle of the plasticizing unit P, provided with a horizontal hydraulic cylinder 17f which is on its rear side secured to the changing table 15 by means of a carrier yoke 17a. The piston rod 17f' of the hydraulic cylinder 17f engages one leg of a U-shaped yoke 17c which is horizontally displaceably supported on guide columns 17b. The guide columns 17b are, in turn, affixed to the carrier yoke 17a. With the other vertical leg of the U-shaped yoke 17c there is axially resiliently connected a ring 17d by means of horizontal pins 17e. The horizontal pins 17e anchored in the ring 17d pass through the last-named vertical leg of the U-shaped yoke 17c in the direction of the nozzle of the plasticizing cylinder 12 and are each surrounded by a coil spring 17g which is supported on a head of the respective horizontal pin 17e and on the respective leg of the U-shaped yoke 17c. In case the yoke 17c is displaced towards the left by a stroke of the hydraulic cylinder 17f, an inner edge profile of the ring 17d assumes a form-fitting position over an upright oriented corresponding edge profile of the feed screw 13 whereby a rotational securement is achieved. In case the U-shaped yoke 17c is further disposed slightly towards the left, its vertical leg which has been so far in engagement with the ring 17d, lifts therefrom whereby the engaging coil springs 17g are biased to a greater or lesser extent. Dependent upon the extent of the bias, the feed screw 13 is, by means of the device 17, axially loaded via the ring 17d. By virtue of such an axial load, the feed screw 13, during the heating of the synthetic material in the plasticizing unit P, cannot be displaced rearwardly so that a rearward escape of the synthetic material from the plasticizing unit is prevented.

The symmetry axis of the hydraulic cylinders 17f (FIG. 1) for the resilient axial loading and for a radial arresting of the feed screw 13 coincides with the injection axis s—s of the plasticizing unit P positioned on the emplacement A. The injection axis of a plasticizing unit P placed on the emplacement A or B is situated in a common horizontal plane with the injection axis of a plasticizing unit P situated in a disengaged position between the mold carrier 11 and the carrier 47.

The plasticizing unit P situated in the disengaged position between the stationary mold carrier 11 and the carrier 47 is transposed onto the emplacement A or B in the following steps:

Prior to uncoupling the plasticizing unit P from its drive aggregate 47, the injection molding unit E is, with the aid of both drive cylinders Z shifted rearwardly to such an extent that the plates 27a of the pivotal lever 27 situated in the upper pivotal position (FIG. 6) assume a position on both sides of the vertical walls 14b of the casing 14 of the plasticizing unit E such that they may be pivoted into a lower pivotal position (FIG. 5) without colliding with the connecting pins 42k of the plasticizing unit P. Thereafter, the pivotal lever 27 is swung from its position shown in FIG. 6 into a position illustrated in FIG. 5. Subsequently, with the aid of the drive cylinders Z the coupling pins 42k are, for establishing a form-fitting connection, pushed into the slots 27b of the plates 27a by an axial stroke of appropriate length of the drive cylinders Z.

Subsequently, the pivotal lever 27 is, together with the plasticizing unit P swung from its position shown in FIGS. 2 and 5 into an upper position illustrated in FIGS. 2a and 6. Then the pivotal lever 27, together with the upended plasticizing unit P is, with the aid of the sled 26, moved on the transport rail 18 over the emplacement A or B. Subsequently, the plasticizing unit P is swung downwardly onto one of the emplacements A or B and is, while centered on the centering pins 16d and 16d' lowered onto the respective emplacement in a horizontal position. Thereafter, the changing table 15 is, with the plasticizing unit P moved away and thereby the coupling pins 42k are pulled out of the respective slots 27b of the plates 27a. For transposing the plasticizing units P from one of the emplacements A or B into the disengaged position between the stationary mold carrier 11 and the carrier 47, the above-described steps are executed in a reverse order.

In a last step, with the aid of the drive cylinders Z, the carrier block 47 of the injection molding unit E is axially shifted in the direction of the plasticizing unit P to such an extent that the coupling organs at the feed screw 13 and the plasticizing cylinder 12 may be coupled with the latter inside the carrier block 47. After such a coupling has been established, the coupling pins 42k are, by means of an appropriate rearward stroke of the drive cylinders Z, pulled out of the slots 27b and the pivotal lever 27 is pivoted upwardly. In this condition the injection molding unit is ready for a normal injection operation.

The present disclosure relates to subject matter contained in Federal Republic of Germany patent application No. P 36 26 647.7 (filed Aug. 6th, 1986) which is incorporated herein by reference.

It will be understood that the above description of the present invention is susceptible to various modifications, changes and adaptations, and the same are intended to be comprehended within the meaning and range of equivalents of the appended claims.

What is claimed is:

1. In an injection molding machine having an injection axis, a service side and an opposite, rear side, including
   an injection mold assembly;
   an injection molding unit;
   a plasticizing unit releasably coupled to said injection molding unit and including a plasticizing cylinder;
   means defining an emplacement situated spaced from said injection axis on said rear side and adapted to receive a plasticizing unit thereon;
   drive cylinder means for displacing said injection molding unit, together with said plasticizing unit parallel to said injection axis for causing said plasticizing cylinder to assume respective engaged and disengaged positions with said injection mold assembly; in said engaged position said plasticizing cylinder is adapted to inject plastic material into said injection mold assembly and in said disengaged position said plasticizing cylinder is separated from said injection mold assembly and is substantially in alignment with said injection axis;
   transposing means for moving said plasticizing unit from said disengaged position onto said emplacement and conversely, said transposing means including
      a stationarily supported transport rail oriented generally horizontally and transversely to said injection axis;
      a sled mounted for travel on said transport rail; and
      a hoisting means mounted on said sled for lifting said plasticizing unit from said disengaged position or said emplacement into a transporting height in which the hoisting means holds said plasticizing unit while being carried by said sled from said disengaged position to said emplacement and conversely;
   the improvement in said transposing means comprising
      (a) a pivotal lever forming part of said hoisting means and being mounted on said sled for up and down swinging motions about a generally horizontal axis;
      (b) first and second cooperating coupling means mounted on said plasticizing unit and said pivotal lever, respectively; said first and second coupling means having a connected state in which said plasticizing unit is rigidly coupled to said pivotal lever for movement from a generally horizontal orientation from said disengaged position or said emplacement through an approximately 90° turn into an upended orientation into said transporting height; and
      (c) a power drive means for swinging said pivotal lever, with said plasticizing unit rigidly attached thereto by said first and second coupling means, into and out of said transporting height.

2. The invention of claim 1, the improvement further comprising said transport rail being cross-sectionally rectangular, having vertically oriented wide sides and horizontally oriented narrow sides; said sled having a cross-sectionally U-shaped configuration straddling said transport rail at three sides thereof with a small clearance; further comprising runner rollers supported in said sled and rollingly engaging the four sides of said transport rail; and bearing sleeves mounted on said sled and being arranged for swingably supporting said pivotal lever.

3. The invention of claim 1, the improvement further comprising a changing table arranged for displacement adjacent and parallel to said injection axis at said rear side; said emplacement is present in a plurality and including a first emplacement constituting a heat conditioning station for the plasticizing unit dwelling therein and a second emplacement constituting a transfer station for the plasticizing unit dwelling therein; said first and second emplacements being arranged on said changing table; said first emplacement being situated between said second emplacement and said injection axis; said changing table having a position in which said transport rail extends over said first and second emplacements.

4. The invention of in claim 1, the improvement further comprising said emplacement constituting a heat conditioning station for the plasticizing unit dwelling in said emplacement; each plasticizing unit includes an injection axis and a feed screw coaxially disposed in said plasticizing cylinder; further comprising means mounted on said emplacement for axially resiliently supporting and for radially immobilizing the feed screw of the plasticizing unit dwelling in said emplacement; said means mounted on said emplacement including a hydraulic cylinder having a symmetry axis being in alignment with the injection axis of the plasticizing unit dwelling on said emplacement; said injection axis of the plasticizing unit dwelling on said emplacement and the injection axis of the plasticizing unit being in said disengaged position between said injection mold assembly and said injection molding unit lie in a common horizontal plane.

5. The invention of claim 1, the improvement further comprising said plasticizing unit having a total length and said plasticizing cylinder having a frontal end terminating in an injection nozzle; said first coupling means being mounted on said plasticizing unit being at an axial distance from said injection nozzle equalling approximately one third of said total length of said plasticizing unit.

6. The invention of claim 5, the improvement further comprising a mold closing unit including a stationary mold carrier having a top edge; said transport rail being affixed to said upper edge of said stationary mold carrier.

7. The invention of claim 1, the improvement further comprising a stationarily and axially rotatable drive spindle extending coaxially with the pivotal axis of said pivotal lever; motor means for rotating said drive spindle and a nut affixed to said sled and traversed by said spindle; means drivingly connecting said spindle with said nut for effecting movement of said nut and said sled along said spindle upon rotation of said spindle.

8. An injection molding machine as defined in claim 7, wherein said spindle and said nut have helical grooves and said means drivingly connecting said spindle with said nut comprising circulating balls accommodated in said grooves.

9. An injection molding machine as defined in claim 1, wherein one of said first and second coupling means comprises coupling slots positionable in a horizonal position parallel to said injection axis and the other of said first and second coupling means includes coupling pins oriented transversely to said injeotion axis; said coupling pins being form-fittingly introduced into and withdrawn from said coupling slots upon a respective relative movement of said plasticizing unit relative to said pivotal lever in a direction parallel to said injection axis.

10. An injection molding machine as defined in claim 9, wherein said plasticizing unit further includes a cross-sectionally U-shaped casing spacedly surrounding said plasticizing cylinder and having parallel side walls and a bottom wall interconnecting said side walls; transverse members oriented generally tangentially to said plasticizing cylinder; clamping yokes securing said plasticizing cylinder to said transverse members; said transvers members projecting through said side walls of said casing and having terminal portions constituting said coupling pins; said coupling pins being cross-sectionally four-sided.

11. An injection molding machine as defined in claim 9, wherein said pivotal lever includes two parallel-oriented plates in which respective said coupling slots are provided; said coupling slots being open at one end and having a horizontal orientation in a lower end position of said pivotal lever and a vertical orientation in an upper end position of said pivotal lever.

12. An injection molding machine as defined in claim 11, wherein said power drive means comprises a hydraulic piston-and-cylinder unit disposed between said parallel-oriented plates of said sled and including a cylinder affixed to said pivotal lever in an orientation parallel to said coupling slots and a piston having a piston rod; a horizontally oriented pivot pin axially rotatably held in said pivotal lever at a distance from said generally horizontal axis about which said pivotal lever swings; said piston rod being transversely arranged to said pivot pin and being secured thereto.

13. An injection molding machine as defined in claim 12, wherein said cylinder has a closure lid mounted on said plates of said pivotal lever by axially aligned cylindrical pins.

14. An injection molding machine as defined in claim 12, wherein said pivotal arm is limited to a swinging motion of 90° by a predetermined stroke length of said piston within said cylinder; said piston being mounted for swinging motions about said pivot pin.

* * * * *